United States Patent [19]

Showalter

[11] 4,120,211

[45] Oct. 17, 1978

[54] TRANSMISSION SHIFT CONTROL MECHANISM

[75] Inventor: Dan Joseph Showalter, Muncie, Ind.

[73] Assignee: Borg-Warner Corporation, Chicago, Ill.

[21] Appl. No.: 794,494

[22] Filed: May 6, 1977

[51] Int. Cl.² ............................................. G05G 9/14
[52] U.S. Cl. ................................. 74/473 R; 74/473 P
[58] Field of Search ................. 74/473 R, 473 P, 476

[56] References Cited

U.S. PATENT DOCUMENTS

| 1,212,026 | 1/1917 | De Bra | 74/473 R |
| 2,077,578 | 4/1937 | Neracher | 74/473 P |

Primary Examiner—Allan D. Herrmann
Attorney, Agent, or Firm—Julian Schachner

[57] ABSTRACT

A transmission shift control mechanism for facilitating forward upshifting or downshifting and at the same time reducing any tendency to shift accidentally into reverse. The shift end of the shift control cane is chamfered to provide flat surfaces transverse to the axes of the shift rails. These surfaces guide movement of the shift end into the appropriate shift rail gate.

4 Claims, 6 Drawing Figures

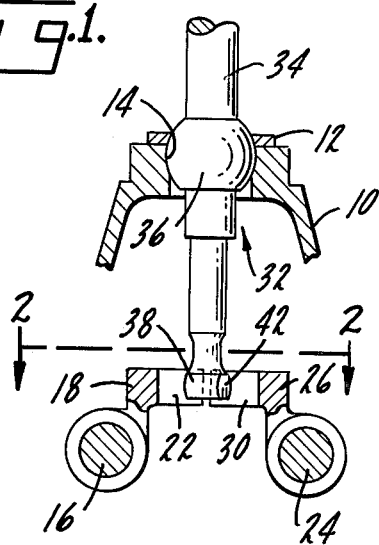
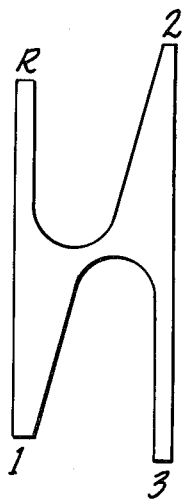
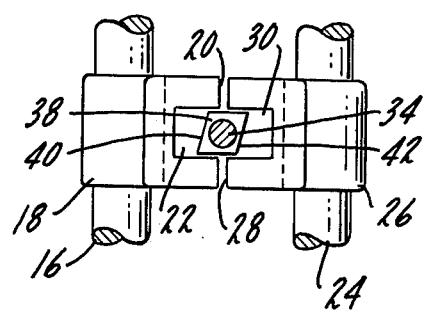
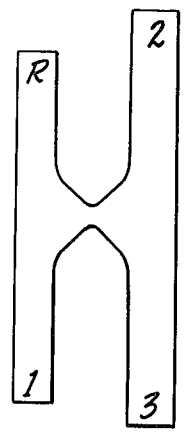
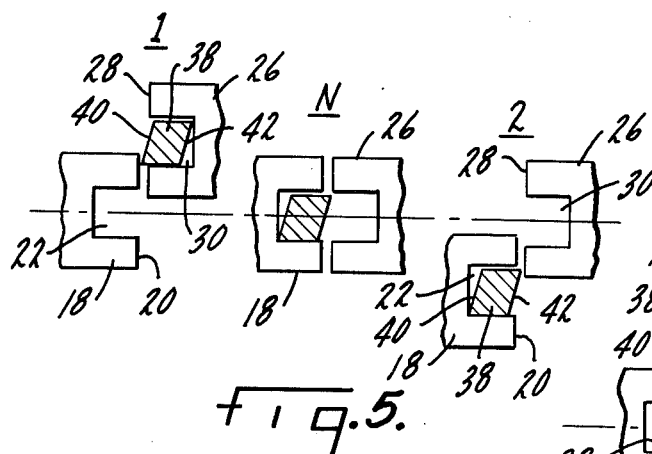
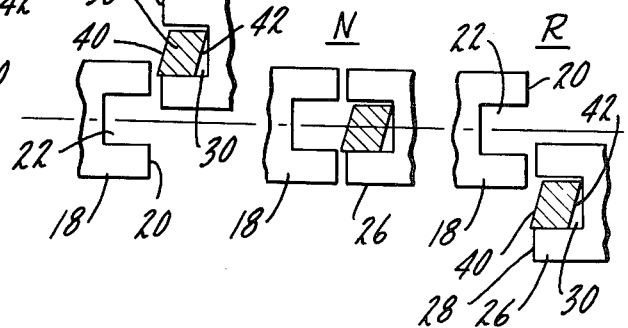

TRANSMISSION SHIFT CONTROL MECHANISM

BACKGROUND OF THE INVENTION

This invention relates generally to automotive transmissions or the like. More particularly it relates to the controlled shifting of a transmission in a manner tending to facilitate forward upshifting or downshifting and reduce the time required to shift through the forward gears, while at the same time tending to prevent inadvertent shifting into reverse.

In recent years there have been many improvements in automotive transmissions, including improvements relating to the shifting of sliding gear manual transmissions. These improvements have involved rather complex structural controls, and in some instances have required additional shift lever control elements. Some such controls have provided additional elements for inhibiting an inadvertent shift toward reverse gear during forward shifting.

There remains a need in the art for improvements in transmission control by providing, for example, a multiple speed sliding gear manual transmission shift control mechanism which successfully facilitates forward upshifting and downshifting, thereby reducing the time required to shift through the forward gears while at the same time reducing the tendency for inadvertently clashing against the reverse clutch teeth.

SUMMARY OF THE INVENTION

A primary object of this invention is to provide an improved transmission shift control mechanism which will meet the need noted above. The invention is directed to an improved shift control mechanism for a sliding gear manual transmission wherein a shift lever or cane is moved to select a shift rail, and thereafter is moved to carry the shift rail and its associated shift fork and synchronizing clutch to a position engaging an appropriate gear. Generally, the first movement to select a shift rail is such that the shift end of the cane moves into a gate provided either in the shift rail itself or in a collar secured to the shift rail. In a multiple speed sliding gear transmission, there generally is provided a plurality of shift rails and associated collars, each collar having a gate.

The invention is directed to the orientation of the shift end of the cane relative to the shift rails or collars. In particular, the shift end of the cane defines flat surfaces transverse to the longitudinal axis of the shift rails. This arrangement facilitates forward upshifting and downshifting while at the same time reducing any tendency to shift inadvertently toward reverse.

By reducing the time required to shift through the forward gears, the invention reduces the likelihood of damage or excessive wear to the transmission and shift control mechanism. In addition, it reduces harmful engine emissions caused by any delay in completing the forward shifting sequence when the carburetor is providing a rich mixture to the engine.

BRIEF DESCRIPTION OF THE DRAWINGS

The objects and advantages of this invention will become apparent to those skilled in the art upon careful consideration of the specification herein, including the drawing, wherein:

FIG. 1 is a sectional view showing the improved cane control assembly and associated transmission shift rails and collars;

FIG. 2 is a view taken along the line 2—2 of FIG. 1 showing details of the shift end of the cane as related to the shift collars:

FIG. 3 is a diagram showing the shift pattern resulting from the new structural arrangement of this invention;

FIG. 4 is a diagram showing a typical shift pattern for prior art shift control mechanisms;

FIG. 5 is a view similar to FIG. 2 showing diagramatically the various positions of the shift end of the cane relative to the shift collars during the shifting sequence from first gear through neutral into second gear; and FIG. 6 is a view similar to FIG. 2 showing diagramatically the various positions of the shift end of the cane relative to the shift collars during the shifting sequence from first gear through neutral into reverse gear.

While this invention is susceptible of embodiment of many different forms, there is shown in the drawing and herein will be described in detail a prefered embodiment, with the understanding that the present disclosure is to be considered as an exemplification of the principles of the invention, and is not intended to limit the invention to this embodiment.

DESCRIPTION OF THE PREFERRED EMBODIMENT

Referring now to the drawing in greater detail, and in particular to FIGS. 1 and 2, there is shown a transmission shift tower 10 adapted to be defined by or secured to an associated automotive transmission housing or the like. A cover 12 is secured to tower 10. Tower 10 and cover 12 together define a socket 14.

A first-reverse shift rail 16 is slidable along its longitudinal axis within the transmission housing. Movement of shift rail 16 causes an associated synchronizing clutch mechanism to engage first gear. Although reverse gear similarly may be synchronized, generally it is not. A shift element or collar 18 is secured to shift rail 16. Collar 18 defines a smooth inner surface 20 and an inwardly opening gate 22.

A second-third shift rail 24 is slidable along its longitudinal axis, parallel to the longitudinal axis of shift rail 16, within the transmission housing. Movement of shift rail 24 causes an associated synchronizing clutch mechanism to engage either second or third gear. A shift element or element or collar 26 is secured to shift rail 24. Collar 26 defines a smooth inner surface 28 adjacent surface 20 of collar 18. In the neutral position shown in FIG. 2, collars 18 and 26 and their respective gates 22 and 30 are in alignment.

A shift member or cane control assembly 32 includes a cane 34 and a ball 36 seated in socket 14. Cane 34 and ball 36 may be formed integrally or, alternatively, ball 36 may be formed separately and pressed on to cane 34.

At its innermost end, cane 34 defines a bulbous or cylindrical shift end 38. As best shown in FIG. 2, shift end 38 defines opposed flat side surfaces 40 and 42 oriented transversely relative to the longitudinal axes of shift rails 16 and 24. In one preferred form of the invention, surfaces 40 and 42 are parallel, and are oriented relative to the longitudinal axes of shift rails 16 and 24 at an angle of approximately 15°.

The angular relationship of side surfaces 40 and 42 relative to the longitudinal axes of shift rails 16 and 24 facilitates upshifting or downshifting between first and second gears, as shown by the shift pattern in FIG. 3.

Assume that first gear is engaged, and it is desired to shift into second gear. The upper end of cane 34 is in the lower left position as viewed by the operator (FIG. 3). This corresponds to the position shown at 1 in FIG. 5.

It is a natural tendency for the operator simultaneously to move the upper end of cane 34 upwardly and rightwardly (FIG. 3) in order to initiate the shift. This corresponds to downward and leftward movement from the position shown at 1 in FIG. 5, such that side surface 40 of shift end 38 abutts and slides along inner surface 20 of collar 18. As cane 34 moves toward the neutral position shown at N in FIG. 5, shift end 38 begins to enter gate 22. By the time cane 34 has reached the neutral position, shift end 38 has moved out of gate 30 of collar 26 and entirely into gate 22 of collar 18. Shift rail 24 is released in the neutral position, and shift rail 16 is engaged.

As the operator continues to move cane 34 upwardly (FIG. 3), shift end 38 moves collar 18 and shift rail 16 downwardly to the position shown at 2 in FIG. 5 until second gear is engaged.

Downshifting from second gear into first gear is similarly performed. As the operator moves the upper end of cane 34 downwardly, leftwardly and downwardly (FIG. 3), shift end 38 moves upwardly, rightwardly and upwardly as shown in FIG. 5. Surface 42 of shift end 38 abutts surface 28 of collar 26. As cane 34 moves toward the neutral position, shift end 38 begins to enter gate 30. When collar 18 has reached the neutral position, shift end 38 has moved out of gate 22 and entirely into gate 30. Shift rail 16 is released in the neutral position, and shift rail 24 is engaged. Continued shifting motion causes collar 26 and shift rail 24 to engage first gear.

In shifting from first gear into reverse gear, the operator moves the upper end of cane 34 upwardly (FIG. 3). This corresponds to downward movement as shown in FIG. 6. Surface 40 of shift end 38 clears surface 20 of collar 18, and shift end 38 moves collar 26 and shift rail 24 downwardly through the neutral position to engage reverse gear.

Shifting from reverse gear into first gear is similarly performed. The upper end of cane 34 is moved downwardly by the operator (FIG. 3). This corresponds to upward movement of shift end 38 as shown in FIG. 6. Again, surface 40 clears surface 20. Collar 26 and shift rail 24 are moved upwardly through the neutral position to engage first gear.

As can be seen from a comparison of the shift patterns of FIGS. 3 and 4, the mechanism of this invention facilitates upshifting and downshifting between first and second gears, while at the same time reducing any tendency to shift inadvertently from first gear toward reverse gear during the first/second upshift. The mechanism is easy to manufacture, and is no more expensive than prior art shift control mechanisms. No additional parts are required, and the new mechanism may be substituted directly into existing transmissions so as to modify them.

In shifting from first gear into second gear, any tendency to overshoot neutral and clash against the reverse clutch teeth is reduced. By facilitating the first/second shift, the shifting time is reduced. Consequently, there is a reduction in harmful engine emissions which otherwise might be caused by shift delay at a time when the operator lifts his foot to close or partially close the throttle and the carburetor is in a rich position.

It should be apparent that although the invention provides a novel arrangement for control of the shifting of a three speed sliding gear manual transmission, it is readily convertable for use in four or five speed, or other transmission assemblies, with or without overdrive. Further, it should be understood that while the preferred embodiment of the invention has been shown and described, this should be considered as illustrative and may be modified by those skilled in the art without departing from the scope thereof, which is to be limited only by the claims herein.

I claim:

1. In a shift control mechanism for a multi-speed transmission including first and second elements movable along first and second parallel axes respectively between engaging and neutral positions, said first and second elements respectively defining first and second gates in alignment in said neutral positions, and a shift member selectively movable into said gates for selecting one of said elements and movable along said axes for moving the selected element along its axis; the improvement wherein said shift member defines first and second opposed flat surfaces oriented respectively at substantially equal acute angles relative to said first and second axes, said shift member and said elements being constructed and arranged such that said shift member is movable in said first gate for moving said first element from one engaged position through its neutral position to another engaged position with said shift member spaced from said second element, said shift member also being movable in said first gate for moving said first element from one engaged position toward its neutral position with said second surface sliding along said second element, being guided by said second surface for movement at one of said acute angles out of said first gate and into said second gate as said first element is moved to its neutral position, and being movable in said second gate for moving said second element from its neutral position to one of its engaging positions with said shift member spaced from said first element.

2. The invention of claim 1, said acute angles being approximately 15°.

3. In a shift control mechanism for a multiple speed ratio power transmission having gears selectively engageable for establishing torque delivery paths between a driving member and a driven member, first and second shift elements respectively movable along first and second parallel axes for selectively engaging said gears, said elements respectively defining first and second adjacent inner surfaces parallel to said axes and first and second inwardly opening gates, and a shift cane having a shift end selectively movable into said gates for selecting one of said elements and movable along said axes for effecting gear engagement, said shift end defining first and second flat surfaces in planes oriented respectively at substantially equal acute angles relative to said first and second inner surfaces of said elements.

4. The invention of claim 3, said acute angles being approximately 15°.

* * * * *